United States Patent
Ohtsu

(10) Patent No.: US 6,896,083 B2
(45) Date of Patent: May 24, 2005

(54) FOUR-WHEEL DRIVE CONTROL SYSTEM AND METHOD

(75) Inventor: Nobuyuki Ohtsu, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 65 days.

(21) Appl. No.: 10/303,033

(22) Filed: Nov. 25, 2002

(65) Prior Publication Data

US 2003/0098193 A1 May 29, 2003

(30) Foreign Application Priority Data

Nov. 26, 2001 (JP) ..................................... P2001-359266

(51) Int. Cl.⁷ ............................................. B60K 23/00
(52) U.S. Cl. ....................................................... 180/197
(58) Field of Search ................................ 180/197, 233, 180/244, 247

(56) References Cited

U.S. PATENT DOCUMENTS

| | | | |
|---|---|---|---|
| 5,041,978 A | * 8/1991 | Nakayama et al. | 701/84 |
| 5,178,231 A | * 1/1993 | Watanabe et al. | 180/248 |
| 5,197,566 A | * 3/1993 | Watanabe et al. | 180/249 |
| 5,253,728 A | * 10/1993 | Matsuno et al. | 180/446 |
| 5,259,476 A | * 11/1993 | Matsuno et al. | 180/197 |
| 5,270,930 A | * 12/1993 | Ito et al. | 701/69 |
| 5,297,646 A | * 3/1994 | Yamamura et al. | 180/415 |
| 5,376,868 A | * 12/1994 | Toyoda et al. | 318/587 |
| 5,813,490 A | * 9/1998 | Takasaki et al. | 180/250 |
| 6,070,685 A | * 6/2000 | Takasaki et al. | 180/250 |
| 6,208,929 B1 | * 3/2001 | Matsuno et al. | 701/89 |
| 6,360,153 B1 | * 3/2002 | Shinmura et al. | 701/48 |
| 6,442,469 B1 | * 8/2002 | Matsuno | 701/70 |
| 6,449,552 B2 | * 9/2002 | Ohba et al. | 701/89 |
| 6,512,972 B1 | * 1/2003 | Glab et al. | 701/69 |
| 6,549,840 B1 | * 4/2003 | Mikami et al. | 701/69 |
| 6,606,549 B1 | * 8/2003 | Murakami et al. | 701/89 |
| 6,702,717 B2 | * 3/2004 | Murakami | 477/182 |

\* cited by examiner

Primary Examiner—Lesley D. Morris
Assistant Examiner—Paul Royal, Jr.
(74) Attorney, Agent, or Firm—Foley & Lardner LLP

(57) ABSTRACT

A four-wheel drive control system is provided which comprises a driving force distribution mechanism for transmitting a driving force from a power source to main driving wheels of a vehicle and capable of distributing the driving force to auxiliary driving wheels of the vehicle, a rotational speed difference detector for detecting a rotational speed difference between the main and auxiliary driving wheels, and a driving force distribution controller for controlling a distribution of the driving force to the main and auxiliary driving wheels on the basis of the rotational speed difference, wherein the driving force distribution controller determines a driving force to be transmitted to the auxiliary driving wheels on the basis of an output of the power source, a longitudinal load distribution in the vehicle and the rotational speed difference. A four-wheel drive control method is also provided.

10 Claims, 8 Drawing Sheets

| XG | WR/W |
|---|---|
| 0.1g OR SMALLER | 0.4 |
| LARGER THAN 0.1g | 0.5 |

FOUR-WHEEL DRIVE CONTROL SYSTEM AND METHOD

BACKGROUND OF THE INVENTION

The present invention relates to a four-wheel drive control system and method for controlling a distribution of a driving force between main and auxiliary driving wheels (e.g., front and rear wheels) of a vehicle by controlling a driving force distribution mechanism in accordance with a rotational speed difference between the main and auxiliary driving wheels.

It has heretofore been proposed a four-wheel drive control system that controls a driving force distribution between front and rear wheels (e.g., main and auxiliary driving wheels) by controlling a driving force distribution mechanism in accordance with a rotational speed difference between the front and rear wheels.

Such a four-wheel drive control system is adapted to judge that a slip or spin of the main driving wheels is caused to obstruct start or acceleration of the vehicle when a rotational speed difference between the front and rear wheels becomes large and increase a driving force distribution to the auxiliary driving wheels.

In the above-described four-wheel drive control system, the driving force to be distributed to the auxiliary driving wheels is not increased until the rotational speed difference between the main and auxiliary driving wheels becomes equal to or larger than a predetermined value and not decreased until the rotational speed difference becomes lower than the predetermined value, i.e., a feedback control based on the rotational speed difference is executed.

For this reason, the above-described four-wheel drive control system encounters a problem that a control hunting that will be described later occurs at running on a low friction road (hereinafter referred to as low-$\mu$ road), climbing, acceleration, etc.

Namely, when the rotational speed difference becomes large, a driving force to be distributed to the auxiliary driving wheels is increased based on the judgment that a spin of the main driving wheels is caused, for thereby making smaller the rotational speed difference between the front and rear wheels. When the rotational speed difference has become small by the above-described control, the driving force to be distributed to the auxiliary driving wheels is decreased based on the judgment that the spin has been ended. However, when the driving force to be distributed to the auxiliary driving wheels is decreased, the rotational speed difference between the front and rear wheels becomes larger again so that the driving force to be distributed to the auxiliary driving wheels is increased again. Thus, there exists a possibility of repeating the control of increasing the driving force distribution to the auxiliary driving wheels and the control of decreasing the same alternately. In such a case, there occurs a problem that the slip or spin of the main driving wheels is never ended.

SUMMARY OF THE INVENTION

It is accordingly an object of the present invention to provide a four-wheel drive control system that is capable of improving the control responsiveness while being capable of preventing a control hunting of repeating a control of increasing a driving force to be distributed to auxiliary driving wheels and a control of decreasing the same alternately.

To accomplish the above object, there is provided according to an aspect of the present invention a four-wheel drive control system comprising a driving force distribution mechanism for transmitting a driving force from a power source to main driving wheels of a vehicle and capable of distributing the driving force to auxiliary driving wheels of the vehicle, a rotational speed difference detector for detecting a rotational speed difference between the main and auxiliary driving wheels, and a driving force distribution controller for controlling a distribution of the driving force to the main and auxiliary driving wheels on the basis of the rotational speed difference, wherein the driving force distribution controller determines a driving force to be transmitted to the auxiliary driving wheels on the basis of an output of the power source, a longitudinal load distribution in the vehicle and the rotational speed difference.

According to another aspect of the present invention, there is provided a four-wheel drive control system comprising a driving force distribution mechanism for transmitting a driving force from a power source to main driving wheels of a vehicle and capable of distributing the driving force to auxiliary driving wheels of the vehicle, a rotational speed difference detector for detecting a rotational speed difference between the main and auxiliary driving wheels, a driving force distribution controller for controlling a distribution of the driving force to the main and auxiliary driving wheels on the basis of the rotational speed difference, a longitudinal acceleration detector for detecting a longitudinal acceleration of the vehicle, and a four-wheel slip detector for detecting whether the main and auxiliary driving wheels are all in a slipping state, wherein the driving force distribution controller determines a driving torque to be transmitted to the auxiliary driving wheels in accordance with the longitudinal acceleration and the rotational speed difference when the main and auxiliary driving wheels are all in a slipping state.

According to a further aspect of the present invention, there is provided a four-wheel drive control method for a vehicle having a driving force distribution mechanism for transmitting a driving force from a power source to main driving wheels of a vehicle and capable of distributing the driving force to auxiliary driving wheels of the vehicle, the method comprising detecting a rotational speed difference between the main and auxiliary driving wheels, controlling a distribution of the driving force to the main and auxiliary driving wheels on the basis of the rotational speed difference, detecting a longitudinal acceleration of the vehicle, and detecting whether the main and auxiliary driving wheels are all in a slipping state, wherein the controlling comprises determining a driving torque to be transmitted to the auxiliary driving wheels in accordance with the longitudinal acceleration and the rotational speed difference when the main and auxiliary driving wheels are all in a slipping state.

The other objects and features of this invention will become understood from the following description with reference to the accompanying drawings.

DESCRIPTION OF THE PREFERRED EMBODIMENTS (First Embodiment)

Figure 1:
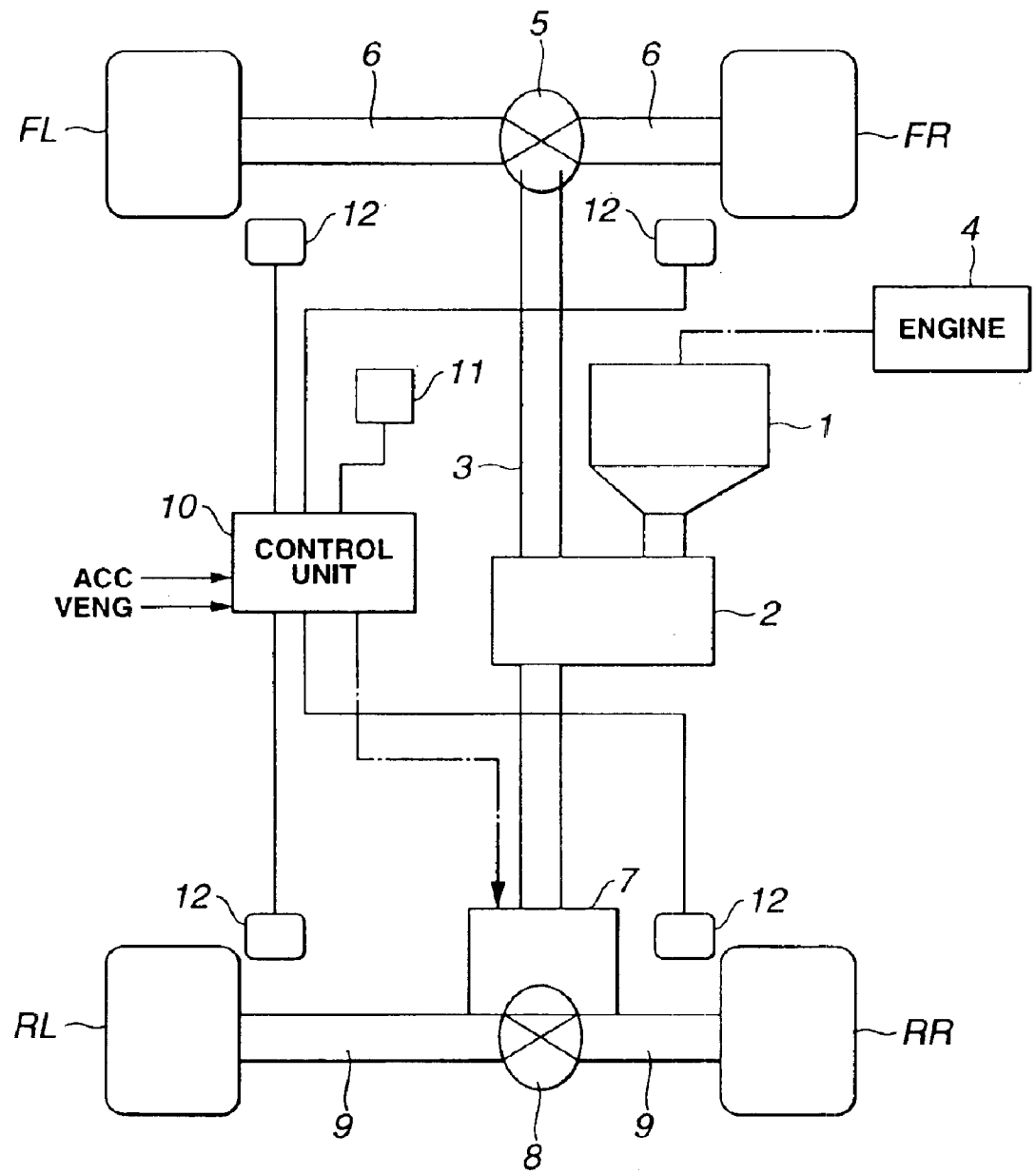
FIG. 1 is a diagrammatic view of a four-wheel drive control system according to a first embodiment of the present invention.

Referring first to FIG. 1, a transmission is indicated by 1 and drivingly connected to internal combustion engine 4 serving as a power source. A driving force from engine 4 is transmitted to transfer 2 after being changed in rotational speed as desired by transmission 1. In the meantime, power source 4 is not limited to an internal combustion engine but can be an electric motor or the like.

Transfer 2 transmits a driving force from transmission 1 to output shaft 3. The driving force transmitted to output shaft 3 is always transmitted to left and right front wheels FL, FR by way of front differential gear 5 and drive shafts 6. When friction clutch 7 is engaged, the driving force transmitted to output shaft 3 is transmitted to left and right rear wheels RL, RL by way of rear differential gear 8 and drive shafts 9.

Clutch 7 changes a rear wheel or auxiliary driving wheel driving force distribution ratio, i.e., a ratio of the driving force to be distributed to rear wheels RR, RL (i.e., auxiliary driving wheels) to a total driving force. Usually, clutch 7 is held disengaged so that all the output of engine 4 is transmitted to front wheels FR, FL. On the other hand, when clutch 7 is engaged, a portion of the output of engine 4 that is determined according to an engagement force of clutch 7 is transmitted to rear wheels RR, RL. Accordingly, clutch 7 and transfer 2 constitute a driving force distribution mechanism or means.

Control unit 10 controls engagement and disengagement of clutch 7 and serves as a driving force distribution controller or control means.

Control unit 10 is operatively connected with longitudinal acceleration sensor (hereinafter referred to as G sensor) 11 for detecting the longitudinal acceleration of the vehicle and wheel speed sensors 12 for detecting wheel speeds of all front and rear wheels FR, FL, RR, RL so that signals representative of a longitudinal acceleration and wheel speeds are inputted to control unit 10. Further, inputted to control unit 10 from an engine control unit (not shown) are signals representative of an accelerator opening degree ACC and engine speed VENG. Based on those signals, a driving force distribution control that will be described later is executed.

Figure 2:
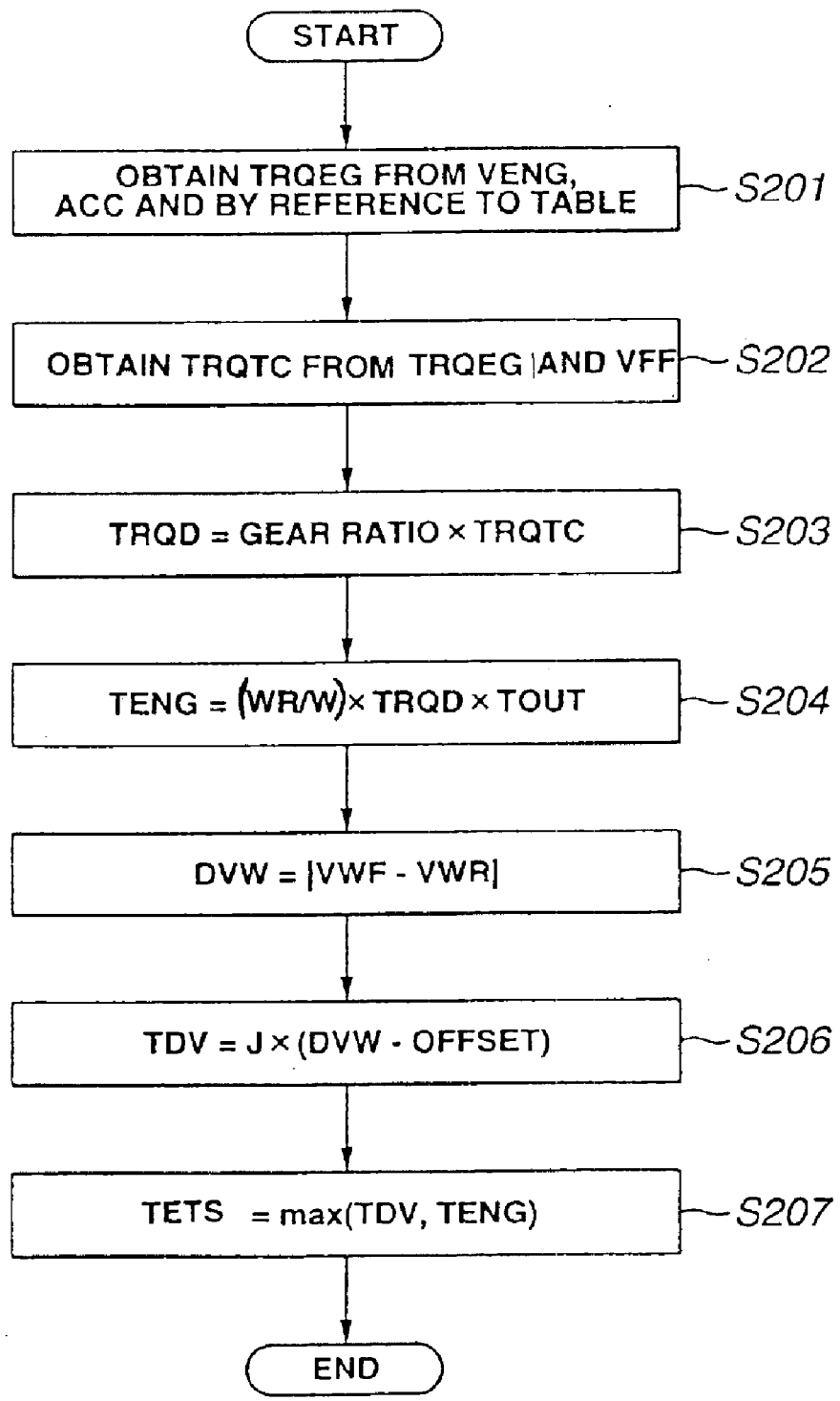
FIG. 2 is a flowchart of a driving force distribution control executed by the four-wheel drive control system of the first embodiment.

Referring to FIG. 2, a driving force distribution control according to the first embodiment of the present invention will be described.

Firstly, in step 201, an engine output torque TRQEG is estimated based on engine speed VENG and accelerator opening degree ACC. In this instance, the estimation can be made by using such a table shown by way of example in FIG. 3 or by using an operation expression.

Then, in step S202, torque converter output torque TRQTC is obtained based on the engine output torque TRQEG obtained in step S201, dummy vehicle body speed VFF and a previously set torque converter characteristic of a torque converter (not shown) provided within transmission 1.

For example, the torque converter output torque TRQTC is obtained from:

$$TRQTC = TCSLP \times k \times TRQEG$$

where TCSLP is a slip rate of the torque converter and obtained from TCSLP=VFF/VENG, and k is a coefficient based on the torque converter characteristic.

In the meantime, the dummy vehicle body speed is an estimated vehicle body speed obtained based on each wheel speed VW. A concrete example of how to obtain the dummy vehicle speed is not described here but will be described in the second embodiment.

Then, in step S203, an axial torque TRQD transmitted to output shaft 3 is obtained from the torque converter output torque TRQTC obtained in step S202 and the gear ratio of transmission 1. For example, the axial torque TRQD can be obtained from:

$$TRQD = \text{gear ratio} \times TRQTC$$

The gear ratio can be obtained from the engine speed VENG and the dummy vehicle body speed VFF and also can be obtained by receiving a signal from an AT (Automatic Transmission) control unit (not shown) for controlling a gear shift of transmission 1.

Then, in step S204, an output-dependent driving torque TENG that is a driving torque desired to be transmitted to rear wheels RR, RL, i.e., auxiliary driving wheels and is variable dependent upon a variable of the engine output torque TRQEG is obtained based on the axial torque TRQD, the longitudinal load distribution WR/W and a transmission characteristic TOUT.

Figures 3, 4:
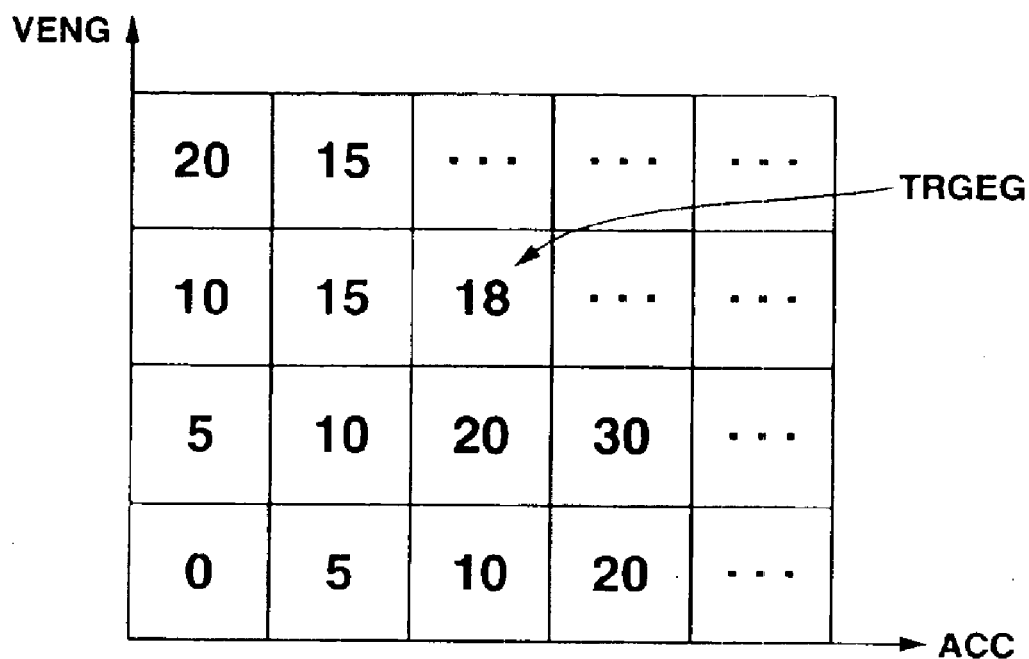
FIG. 3 is a table for obtaining an engine output torque from an engine speed and an accelerator opening degree.
FIG. 4 is a table for determining a longitudinal load distribution based on a longitudinal acceleration of a vehicle.

Namely, the output-dependent driving torque TENG is obtained from:

$$TENG = (WR/W) \times TRQD \times TOUT$$

where WR is a rear wheel load and W is the gross weight of the vehicle. WR/W is therefore a longitudinal load distribution component for determining the output-dependent driving torque TENG. The value of WR/W may be set fixed previously or may be altered depending upon a variation of the longitudinal acceleration XG detected by G sensor as shown in the table of FIG. 4.

Figure 5:
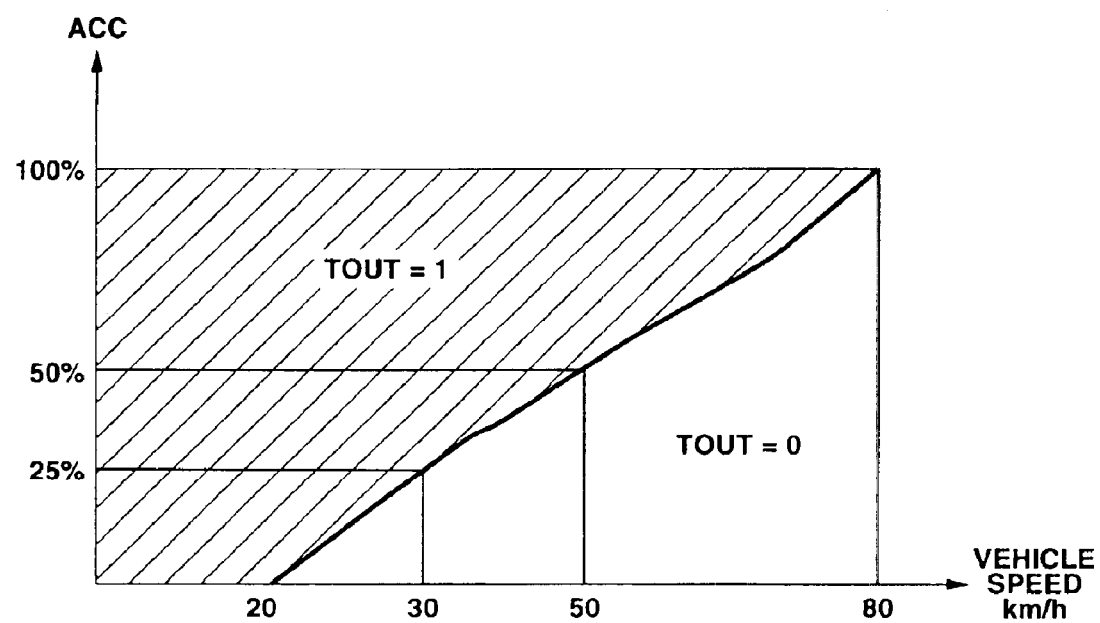
FIG. 5 is a diagram for determining a transmission characteristic of the four-wheel drive control system of the first embodiment based on a vehicle speed and an acceleration opening degree.

Further, the transmission characteristic TOUT is set by way of example as shown in FIG. 5. In the first embodiment, the transmission characteristic TOUT is set so as to become more zero (TOUT=0) as the vehicle speed becomes higher, for priority of fuel consumption, thereby attaining a two-wheel drive condition where a driving force is not transmitted to rear wheels RR, RL and so as to transmit a larger driving force to rear wheels RR, RL, i.e., so as to attain a four-wheel drive condition as the accelerator opening degree ACC becomes larger for thereby preventing front wheels FR, FL that serve as the main driving wheels from slipping or spinning as much as possible. The control in steps S201 to S204 is for obtaining the output-dependent driving torque TENG and constitutes an output driving torque determining section or means.

Subsequent steps S205 and S206 execute a control for obtaining a rotational difference-dependent driving torque TVD that is a driving torque of rear wheels RR, RL serving as auxiliary driving wheels and varies dependent upon a variation of a rotational speed difference between front and rear wheels FR, FL, RR, RL. Thus, a control in steps S205 and S206 constitutes a rotational difference driving torque determining section or means.

In step S205, a rotational speed difference DVW is obtained from a front wheel speed VWF that is an average of wheel speeds VWFF, VWFL of front wheels FR, FL and a rear wheel speed VWR that is an average of wheel speeds VWRR, VWRL of rear wheels RR, RL.

For example, the rotational speed difference DVW is obtained from:

$$DVW=|VWF-VWR|$$

Then, in step S206, the rotational difference-dependent driving torque TDV is obtained based on the rotational speed difference DVW, a previously set coefficient J and an offset value OFFSET.

For example, the rotational difference-dependent driving torque TDV is obtained from:

$$TDV=J\times(DVW-OFFSET)$$

where the offset value OFFSET is set or determined on consideration of the case where tires of different diameters are used so that the rotational difference-dependent driving torque TDV is not given unless a rotational speed difference of a certain degree is caused between front and rear wheels FR, FL, RR, RL.

Then, in step S207, it is executed a control for regarding the larger one of the output-dependent driving torque TENG obtained in step S204 and the rotational difference-dependent driving torque TDV obtained in step S206 as a final driving torque TETS that is a driving torque to be transmitted to rear wheels RR, RL serving as auxiliary driving wheels. The control in step 207 constitutes a distribution determining section or means.

Then, the operation of the first embodiment will be described.

Figure 6:
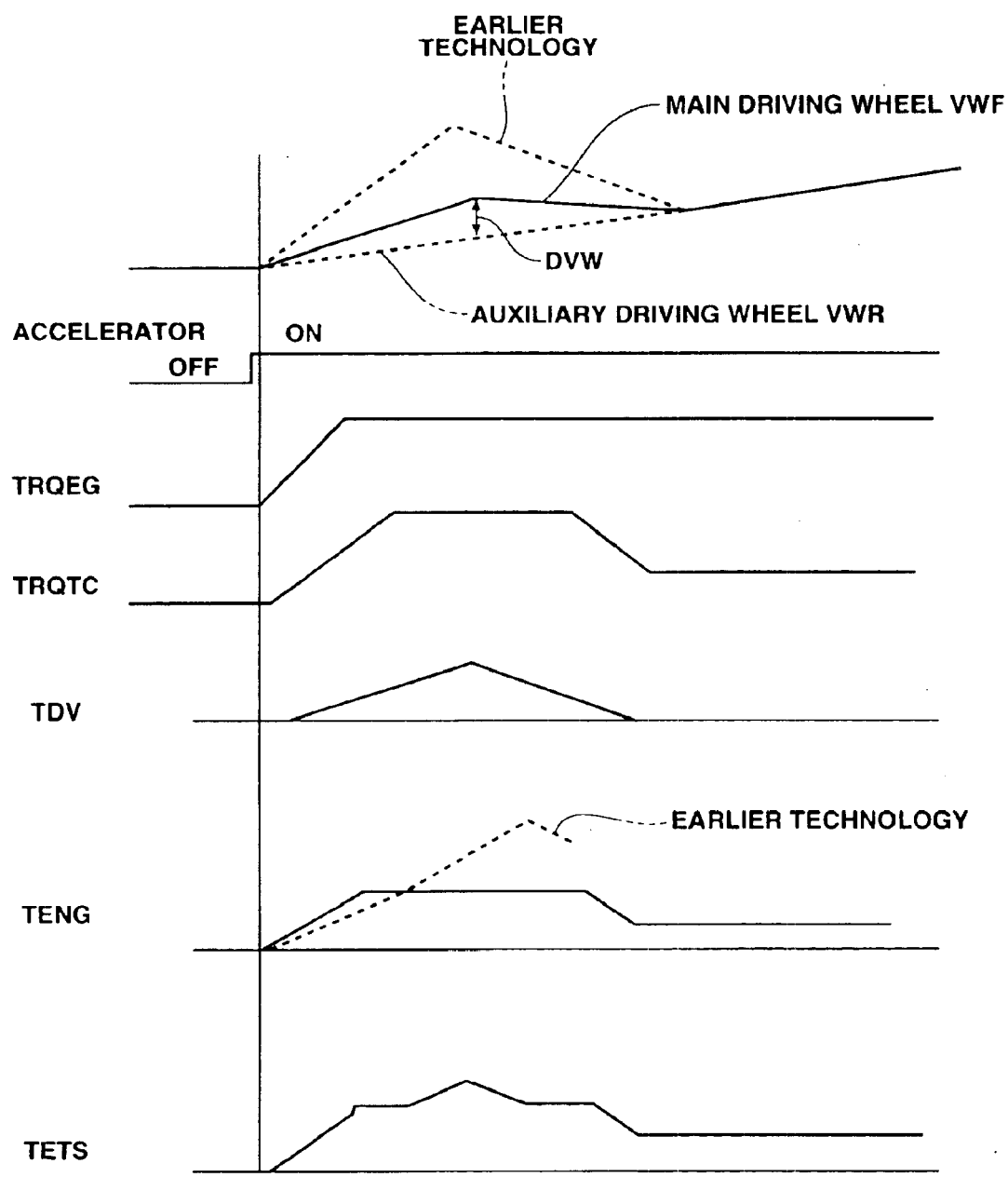
FIG. 6 is a time chart showing an operation of the four-wheel drive control system of the first embodiment at the time of running of a vehicle on a low-$\mu$ road.

FIG. 6 is a time chart of an example of the operation when the vehicle is accelerated on a low-$\mu$ road.

When an accelerator pedal (not shown) is depressed (i.e., accelerator is switched from OFF to ON) to allow the engine output torque TRQEG to increase, the torque converter output torque TRQTC is caused to vary as shown. In response to this, the output-dependent driving torque TENG that is obtained by the control in steps S201 to S204 is formed as indicated by the solid line in the figure.

Further, when an acceleration operation causes a slip of front wheels FR, FL thereby causing the rotational speed difference DVW between front and rear wheels FR, FL, RR, RL, the rotational difference-dependent driving torque TDV is caused as shown by the control in steps 205 and 206.

Thus, the final driving torque TETS to be transmitted to rear wheels RR, RL and finally determined by the control in step S207 becomes such one shown in FIG. 6 since it is determined by selecting larger one of the output-dependent driving torque TENG and the rotational difference-dependent driving torque TDV.

In case the four-wheel drive control is executed based on only the rotational speed difference DVW of the front and rear wheels, it takes time to start transmission of a driving force to rear wheels because the transmission is performed after occurrence of the rotational speed difference DVW and after the acceleration operation since the offset value OFFSET is usually provided. In contrast to this, in this embodiment, the output-dependent driving torque TENG is formed in response to an increase of the torque converter output torque TRQTC of transmission 1 that is caused in response to an increase of the output torque of engine 4. In response to this, transmission of a driving force to rear wheels RR, RL is started, thus making it possible to improve the responsiveness and prevent occurrence of slippage of driving wheels more efficiently as compared with that of an earlier technology.

Further, a delay of control responsiveness is liable to cause control hunting but such a delay can be eliminated or suppressed by this embodiment.

For example, in the first embodiment, the time at which the output-dependent driving torque TENG starts being formed is earlier as compared with the time at which the rotational difference-dependent driving torque TDV starts being formed. From this, it will be understood that the driving force transmission responsiveness based upon the output-dependent driving torque TENG is high.

Further, since in the first embodiment the output-dependent driving torque TENG is formed based upon the front and rear load distribution as shown in step S204, a suitable driving torque distribution between the main and auxiliary driving wheels can be attained. This makes it possible to prevent not only an excessively large spin or slip of the main driving wheels but control hunting. Further, by altering the longitudinal load distribution based upon the front and rear acceleration XG, it becomes possible to attain a control suited to an actual load distribution state and therefore a more accurate control.

Further, since in this embodiment the transmission characteristic TOUT used for determining the output-dependent driving torque TENG in step S204 is set so as to be such one that is dependent upon the vehicle speed and accelerator opening degree ACC as shown in FIG. 5, it becomes possible to improve the fuel consumption by putting the vehicle into a two-wheel drive condition at high-speed running while attaining a running stability by putting the vehicle into a four-wheel drive condition at acceleration at a corner or on a low-$\mu$ road thereby preventing an excessive understeer at running mainly driven by front wheels FR, FL or an excessive oversteer at running mainly driven by rear wheels RR, RL.

Further, since the engine output torque TRQEG is estimated based on the engine speed VEGG and accelerator opening degree ACC as shown in step S201, it is not necessitated to obtain an engine controller information by a CAN (Controller Area Network) communication and therefore a simplification of a vehicle communication means.

Further, since the torque converter output torque TRQTC is obtained based on the engine output torque TRQEG and the dummy vehicle body speed VFF as shown in step S202 thereby obtaining a torque actually transmitted to output shaft 3, it becomes possible to obtain the output-dependent driving torque TENG to be transmitted to the auxiliary driving wheels with a high accuracy.

(Second Embodiment)

Second embodiment will now be described. Since the basic structure of the second embodiment is substantially similar to that of the first embodiment, description thereto is omitted for brevity and description will be made only to a driving force distribution control that is different from that of the first embodiment.

Figure 7:
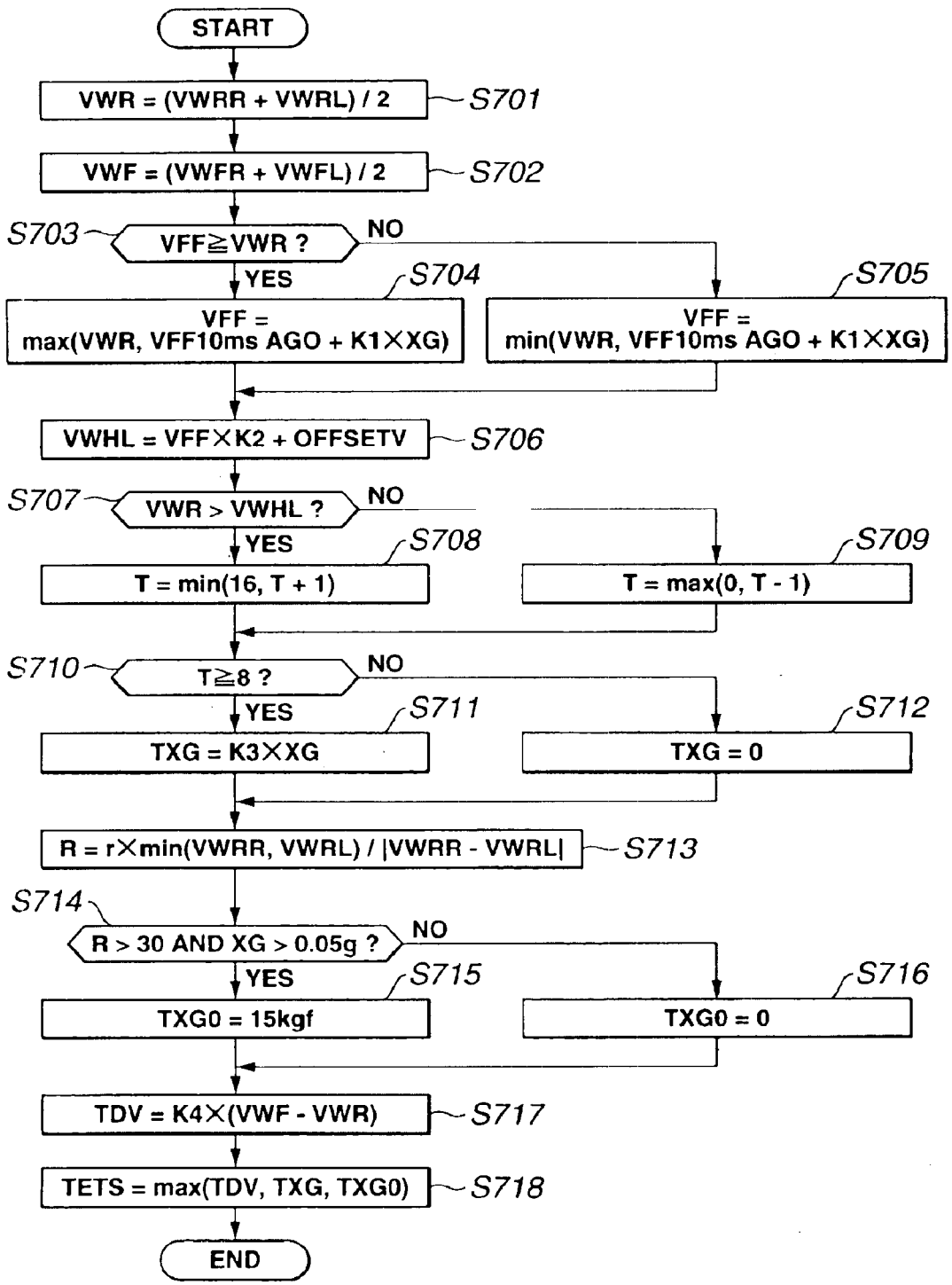
FIG. 7 is a flowchart of a driving force distribution control in a four-wheel drive control system according to a second embodiment of the present invention.

FIG. 7 is a flowchart of a driving force distribution control in the four-wheel drive control system of the second embodiment.

In step S701, a rear wheel speed VWR is obtained. In the meantime, the rear wheel speed VWR is obtained from an average of the wheel speeds VWRR, VWRL of rear wheels RR, RL, i.e., obtained from:

$$VWR=(VWRR+VWRL)/2$$

Further, in step S702, a front wheel speed VWF is obtained from wheel speeds VWFR, VWFL of front wheels FR, FL.

Then, in steps S703 to S705, the dummy vehicle body speed VFF is obtained on the basis of the judgment on whether the vehicle is in an accelerated or decelerated state.

Namely, in step S703, it is determined whether the dummy vehicle body speed VFF (last or preceding value) is equal to or larger than the rear wheel speed VWR (VFF≧VWR). If the answer in step S703 is affirmative, the program proceeds to step S704. If the answer in step S703 is negative (VFF<VWR), the vehicle is judged to be in a decelerated state and the program proceeds to step S705.

In step S704, the dummy vehicle speed VFF is obtained from:

$$VFF=\max(VWR, VFF\ 10\ ms\ ago+K1\times XG)$$

Namely, smaller one of the rear wheel speed VWR at the point of time and the value obtained by multiplying the 10 msec ago dummy vehicle body speed (VFF 10 ms ago) by the longitudinal acceleration XG and the coefficient K1 is determined to be the dummy vehicle body speed VFF.

Then, in step S706, a wheel spin threshold value VWHL used for judgment on a torque slip is calculated.

Namely, the wheel spin threshold value VWHL is set at a value that is far higher than the dummy vehicle body speed VFF. In this second embodiment, the wheel spin threshold value VWHL is obtained from:

$$VWHL=VFF\times K2+OFFSETV$$

The coefficient K2 is set at a value a little larger than 1, such as 1.05 or so. The offset value OFFSETV is set at a value of around 2 to 4 km/h.

Then, in steps S707 to S710, it is determined whether all the wheels are spinning, i.e., judgment on four-wheel spin is made.

Namely, in step S707, it is determined whether the rear wheel speed VWR exceeds the wheel spin threshold value VWHL. If VWR>VWHL (the answer in step S707 is affirmative), it is determined that four wheels are in a spinning state and the program proceeds to step S708 where one is added to the count of judgment timer T and smaller one of the added value (T+1) and the set value (16 in the second embodiment) is determined as the value of judgment timer T.

On the other hand, if it is determined in step S707 that VWR≦VWHL, it is judged that four wheels are not in a spinning sate and the program proceeds to step S709 where one is subtracted from the count of judgment timer T and larger one of the subtracted value (T−1) and 0 (zero) is determined to be the value of judgment timer T.

Accordingly, in steps S707 to S709, judgment timer T is made to take a count every time when a four-wheel spinning state is caused.

In step S710, final judgment on four-wheel spin is made. Namely, in step S710, it is determined whether the count of judgment timer T is equal to or larger than 8. If the count of judgment timer T exceeds 8, it is finally determined that four-wheel spin is caused and the program proceeds to step S711. If the count of judgment timer T is smaller than 8, four-wheel spin is not caused and the program proceeds to step S712.

The control in steps S701 to S710 constitutes a four-wheel slip detector or detecting means.

In step S711, an acceleration-dependent driving torque TXG is calculated based on the longitudinal acceleration XG, i.e., calculated from:

$$TXG=K3\times XG$$

On the other hand, in step S712, the acceleration-dependent driving torque TXG is set to zero (TXG=0).

In this manner, when the acceleration-dependent driving torque TXG is set to 0 (zero) when four-wheel slip is judged not to be caused and formed based on the longitudinal acceleration XG at the point of time when four-wheel slip is judged to be caused.

Then, in steps S713 to S716, climbing of the vehicle is detected and a sloping road-dependent driving torque TXG0 is formed.

Namely, in step S713, a turning radius R is obtained from the wheel speeds VWRR, VWRL of rear wheels RR, RL and a tread "r" that is previously inputted to control unit 10.

In the meantime, the turning radius R is calculated from:

$$R=r\times\min(VWRR, VWRL)/|VWRR-VWRL|$$

Then, in step S714, climbing is detected based on the longitudinal acceleration XG, i.e., climbing is determined whether the longitudinal acceleration XG is larger than a predetermined value (0.05 g in the second embodiment). Namely, the determination is made by utilizing the fact that the output of G sensor 12 offsets in the plus direction depending upon the inclination of the vehicle at climbing.

Further, in the second embodiment, when the vehicle is cornering, no driving force is distributed to rear wheels RR, RL for preventing a tight corner brake phenomenon though it is judged that the vehicle is climbing. Accordingly, in step S714, it is also determined whether the turning radius R is larger than a set value (30 m in the second embodiment).

If it is determined in step S715 that R>30 m and XG>0.5 g, it is judged that the vehicle is in a climbing state and the program proceeds to step S715 where the sloping road-dependent driving torque TXG0 is set at a predetermined value. The predetermined value is 15 kgf in the second embodiment but is not limited thereto.

On the other hand, if it is determined in step S714 that either of R>30 m or XG>0.5 g is satisfied, it is judged that the vehicle is not in a climbing state and the program proceeds to step S716 where the sloping road-dependent driving torque TXG0 is set to zero (TXG0=0).

In the foregoing, a control in steps S713 constitutes a vehicle climbing detector or detecting means. Further, the control in steps S715, S716 constitutes a sloping road driving torque determining section or means.

In step S717, the rotational difference-dependent driving torque TDV is calculated from the difference between the front wheel speed VWF and the rear wheel speed VWR, i.e., from:

$$TDV=K4\times(VEF-WR)$$

The control in step S717 thus constitutes a rotational difference driving torque determining section or means. In the meantime, K4 is a coefficient.

In step S714, largest one of the rotational difference-dependent driving torque TDV, the acceleration-dependent driving torque TXG and the sloping road-dependent driving torque TXG0 is determined to be the final driving torque TETS. Thus, the control in step S714 constitutes a distribution determining section or means.

Then, the operation of the second embodiment will be described.

Figure 8:
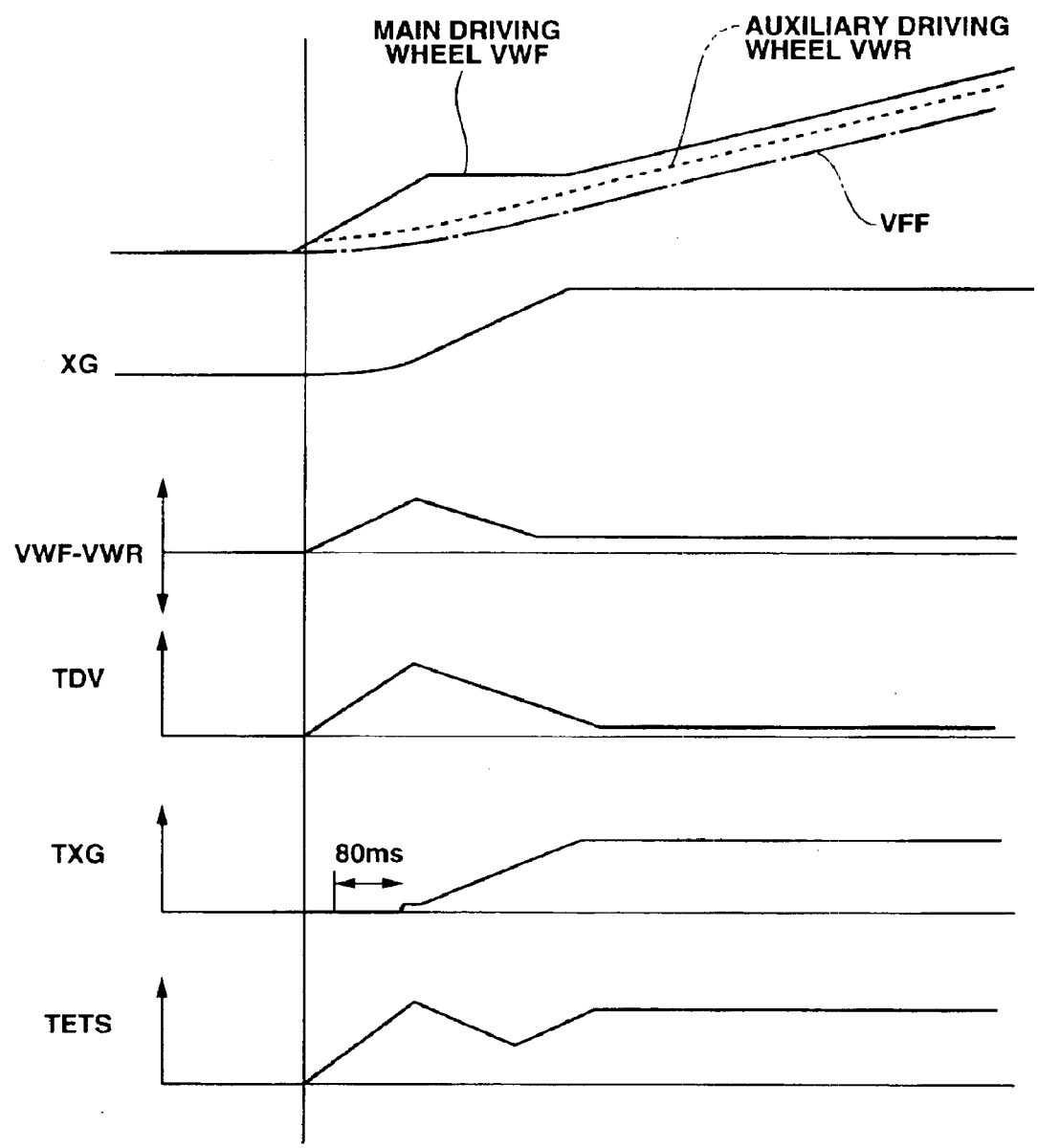
FIG. 8 is a time chart showing an operation of the four-wheel drive control system of the second embodiment at the time of running of a vehicle on a low $\mu$-road.

FIG. 8 is a time chart showing the operation at acceleration of the vehicle on a low-$\mu$ road.

The chart shows the case where acceleration causes a rotational speed difference between front and rear wheels FR, FL, RR, RL, the rotational speed difference causes a rotational difference-dependent driving torque TDV in response to which a driving torque corresponding to the final driving torque TETS is transmitted to rear wheels RR, RL, and a slip of rear wheels RR, RL serving as the auxiliary driving wheels is resultantly caused.

When this is the case, the vehicle is put into a four-wheel slipping state. When, in this state, 80 msec that is the time for judgment timer T to count 8 elapses, the acceleration-dependent driving torque TXG that is dependent upon the longitudinal acceleration XG at the point of time is formed.

The acceleration-dependent driving torque TXG is formed during the time the longitudinal acceleration XG is produced although the rotational speed difference DVW becomes smaller as shown. Thus, the final driving torque TETS of a relatively large value is formed even after the rotational speed difference DVW becomes small.

Accordingly, even after a driving wheel slip is ended, a driving torque continues to be transmitted to rear wheels RR, RL so that control hunting is not caused.

For example, in case the driving force distribution is performed based upon only the rotational difference-dependent driving torque TDV, a transmission of driving torque to rear wheels RR, RL is ended when the driving wheel slip is ended so that under such an acceleration condition a slip of the main driving wheels is caused again and therefore a control hunting is caused as described hereinbefore.

Since in the second embodiment the acceleration-dependent driving torque TXG is formed based on the longitudinal acceleration XG and the final driving torque TETS is determined based on XG and so on, it becomes possible to prevent the control hunting otherwise caused, for example, at such acceleration on a low-$\mu$ road shown in FIG. 8. Namely, at running on a low-$\mu$ road, a distribution of a driving force to the auxiliary driving wheels may cause four wheels to slip. In such a case, there is not caused any rotational speed difference between the front and rear driving wheels so that the transmission of a driving torque to the auxiliary driving wheels is stopped, though four wheels still need be driven. This causes control hunting and a deteriorated running stability. The four-wheel drive control system of this invention does not cause such control hunting and deteriorated running stability.

Then, the operation at climbing will be described.

Figure 9:
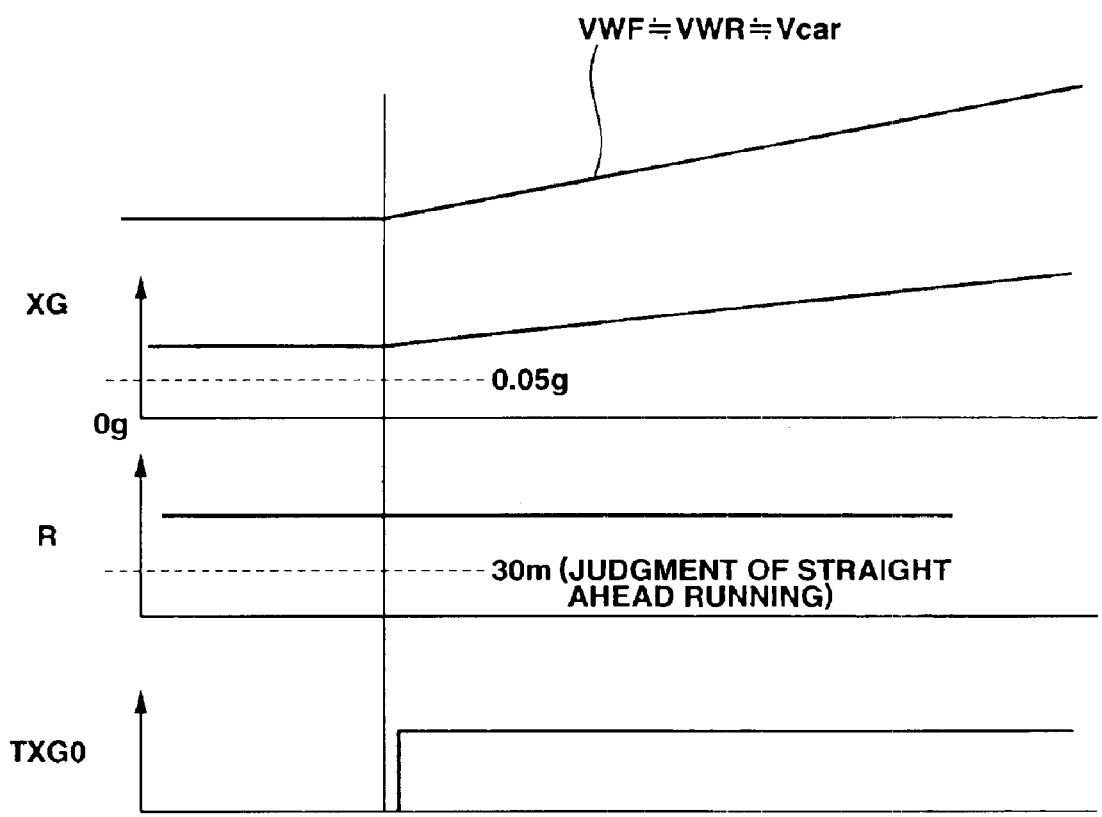
FIG. 9 is a time chart showing an operation of the four-wheel drive control system of the second embodiment when a vehicle starts climbing.

FIG. 9 is a time chart showing the operation of the four-wheel drive control system when the vehicle at climbing starts from a stopped condition.

As shown, at climbing, the longitudinal acceleration XG is detected based on the inclination of the vehicle that inclines so as to have a front end at a higher position.

Further, in the illustrated example, the vehicle is in a nearly straight ahead running condition.

Accordingly, immediately after start of the vehicle, the turning radius that is obtained in step S713 from the rear wheel speeds VERR, VWRL becomes larger than 30 m, and judgment of climbing is made in step S714 and an initial torque of 15 kgf is given as the sloping road-dependent driving torque TXG0.

Thus, clutch 7 is engaged to transmit a driving torque to rear wheels RR, RL such that a slip or spin of the main driving wheels (front wheels FF, FL) is not caused from the time immediately after start of the vehicle and the control hunting is not caused.

Furthermore, for formation of the sloping road-dependent driving torque TXG0, judgment on the turning radius is made. This makes it possible to prevent a tight corner braking phenomenon at climbing and execute a delicate control.

In the meantime, at climbing of a vehicle whose front wheels are main driving wheels, the front wheels are liable to spin since the load on the front wheels become smaller as compared with that when the vehicle is on a flat or level ground. In such a case, a feedback control based on the rotational speed difference according to an earlier technology will not cause a driving torque to be distributed to the rear wheels that are the auxiliary driving wheels until a slip or spin of the main driving wheels occurs. Such a feedback control is poor in responsiveness and may possibly cause control hunting.

From the foregoing, it will be understood that according to the present invention the driving force distribution controller determines the driving force to be transmitted to the auxiliary driving wheels on the basis of the output of the power source, the longitudinal load distribution and the rotational speed difference. Accordingly, by determining the driving force to be transmitted to the auxiliary driving wheels in accordance with the output of the power source, it becomes possible to carry out a suitable driving force distribution to the auxiliary driving wheels before a rotational speed difference between the main and auxiliary driving wheels is caused. This makes it possible to prevent a slip or spin of the main driving wheels with a high responsiveness. Furthermore, by determining the driving force distribution in accordance with the longitudinal load distribution in addition to the output of the power source, an excessively large slip or spin of the main driving wheels can be prevented with more assuredness. Further, as compared with a driving force distribution control according to an earlier technology that is executed based on only the rotational speed difference, occurrence of a rotational speed difference of the main and auxiliary driving wheels itself can be prevented, and it becomes possible to prevent decrease of the rotational speed difference from causing the driving force distribution to the auxiliary driving wheels to be stopped though the driving force distribution to the auxiliary driving wheels is still necessitated, thus making it possible to prevent occurrence of control hunting. In the meantime, when a rotational speed difference between the main and auxiliary driving wheels is caused, a driving force is distributed to the auxiliary driving wheels in accordance with the rotational speed difference similarly to the earlier technology, thus making it possible to prevent a slip or spin of the main driving wheels.

It will be further understood that according to the present invention a driving force distribution to the auxiliary driving wheels is controlled so as to become large when the output-dependent driving force that is determined based on the output of the power source and the longitudinal distribution, though the rotational speed difference between the main and auxiliary driving wheels is small and the rotational difference-dependent driving force is small. This makes it possible to prevent a slip or spin of the main driving wheels and control hunting.

It will be further understood that according to the present invention it becomes possible to attain a more suitable and accurate control of a driving force distribution to the auxiliary driving wheels at running on a low-$\mu$ road or climbing, thus making it possible to prevent a slip or spin of the main driving wheels and control hunting with more assuredness.

It will be further understood that according to the present invention a suitable driving force distribution to the auxiliary driving wheels is executed based on the longitudinal acceleration in addition to the rotational speed difference between the main and auxiliary driving wheels when four wheels (i.e., all the main and auxiliary driving wheels) are slipping at running on a low-$\mu$ road or climbing. This makes it possible to prevent a driving force distribution to the auxiliary driving wheels from being stopped or suspended due to the fact that a slip of the four wheels causes the rotational speed difference between the main and auxiliary driving wheels to become nearly zero, though the vehicle is at acceleration or climbing and the four wheels are slipping, thus making it possible to prevent control hunting and attain a running stability. Further, if control hunting is caused, a variation of the longitudinal acceleration will occur. Thus, by determining the driving force distribution to the auxiliary driving wheels in accordance with the longitudinal acceleration, it becomes possible to suppress the control hunting.

It will be further understood that according to the present invention a driving force distribution to the auxiliary driving wheels at the time of occurrence of four-wheel slip is controlled so as to become large when the longitudinal acceleration-dependent driving torque that is determined based upon the longitudinal acceleration is large, irrespective of the rotational speed difference between the main and auxiliary driving wheels. This makes it possible to execute a driving force distribution to the auxiliary driving wheels based upon the longitudinal acceleration even when the driving force distribution to the auxiliary driving wheels at running on a low-$\mu$ road or acceleration causes the four wheels to slip and therefore the rotational speed difference to become small, thus making it possible to prevent a slip or spin of the main driving wheels from becoming larger and also prevent control hunting.

It will be further understood that according to the present invention a driving force distribution to the auxiliary driving wheels at climbing is determined based on a sloping road-dependent driving torque at the point of time before the rotational speed difference becomes small or a slip of four wheels is caused, thus making it possible to prevent a slip or spin of the main driving wheels and control hunting.

The entire contents of Japanese Patent Application P2001-359266 (filed Nov. 26, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while the embodiments have been described with respect to the case where the main driving wheels are the front wheels, the main wheels can be rear wheels. Further, while the first embodiment has been described with respect to the case where the output-dependent driving torque TENG that is dependent upon the engine output torque TRQEG and the rotational difference-dependent driving torque TDV that is dependent upon the rotational speed difference DVW are formed separately and the driving torque to be distributed to the auxiliary driving wheels is controlled based on larger one of TENG and TDV, this is not limitative but a driving torque to be transmitted to the auxiliary driving wheels can be determined otherwise so long as it is determined based on the output of the power source, the longitudinal load distribution and the rotational speed difference. For example, the driving torque to be transmitted to the auxiliary driving wheels can be obtained by an operational expression that executes addition or multiplication of a term with a variable of the engine output torque TRQEG and the term with a variable of the rotational speed difference DVW. Further, the driving torque to be transmitted to the auxiliary driving wheels in the second embodiment can be determined otherwise so long as it is controlled based on the longitudinal acceleration and the rotational speed difference between the front and rear wheels at the time of occurrence of a slip of four wheels. For example, the driving torque to be transmitted to the auxiliary driving wheels can be obtained from an operational expression that executes addition or multiplication of the term with a variable of the longitudinal acceleration XG and the term with a variable of the rotational speed difference DVW.

The scope of the invention is defined with reference to the following claims.

What is claimed is:

1. A four-wheel drive control system comprising:
   a driving force distribution mechanism for transmitting a driving force from a power source to main driving wheels of a vehicle and capable of distributing the driving force to auxiliary driving wheels of the vehicle;
   a rotational speed difference detector for detecting a rotational speed difference between the main and auxiliary driving wheels; and
   a driving force distribution controller for controlling a distribution of the driving force to the main and auxiliary driving wheels on the basis of the rotational speed difference, the driving force distribution controller comprising:
      a rotational difference driving torque determining section for determining a rotational difference-dependent driving torque on the basis of the rotational speed difference;
      an output driving torque determining section for determining an output-dependent driving torque on the basis of the output of the power source and the longitudinal load distribution; and
      a distribution determining section for determining a larger one of the rotational difference-dependent driving torque and the output-dependent driving torque to be the driving torque to be transmitted to the auxiliary driving wheels,
   wherein the driving force distribution controller determines a driving force to be transmitted to the auxiliary driving wheels on the basis of an output of the power source, a longitudinal load distribution in the vehicle and the rotational speed difference.

2. A four-wheel drive control system according to claim 1, wherein the output driving torque determining section alters a longitudinal load distribution component for determining the output-dependent driving torque, on the basis of a longitudinal acceleration of the vehicle.

3. A four-wheel drive control system comprising:
   a driving force distribution mechanism for transmitting a driving force from a power source to main driving wheels of a vehicle and capable of distributing the driving force to auxiliary driving wheels of the vehicle;
   a rotational speed difference detector for detecting a rotational speed difference between the main and auxiliary driving wheels;

a driving force distribution controller for controlling a distribution of the driving force to the main and auxiliary driving wheels on the basis of the rotational speed difference;

a longitudinal acceleration detector for detecting a longitudinal acceleration of the vehicle; and a four-wheel slip detector for detecting substantially simultaneously whether the main and auxiliary driving wheels are all in a slipping state;

wherein the driving force distribution controller determines a driving torque to be transmitted to the auxiliary driving wheels in accordance with the longitudinal acceleration and the rotational speed difference when the main and auxiliary driving wheels are all in a slipping state.

4. A four-wheel drive control system comprising:

a driving force distribution mechanism for transmitting a driving force from a power source to main driving wheels of a vehicle and capable of distributing the driving force to auxiliary driving wheels of the vehicle;

a rotational speed difference detector for detecting a rotational speed difference between the main and auxiliary driving wheels;

a driving force distribution controller for controlling a distribution of the driving force to the main and auxiliary driving wheels on the basis of the rotational speed difference;

a longitudinal acceleration detector for detecting a longitudinal acceleration of the vehicle; and a four-wheel slip detector for detecting whether the main and auxiliary driving wheels are all in a slipping state;

wherein the driving force distribution controller determines a driving torque to be transmitted to the auxiliary driving wheels in accordance with the longitudinal acceleration and the rotational speed difference when the main and auxiliary driving wheels are all in a slipping state, and wherein the driving force distribution controller comprises:

a rotational difference driving torque determining section for determining a rotational difference-dependent driving torque on the basis of the rotational speed difference;

an acceleration driving torque determining section for determining an acceleration-dependent driving torque on the basis of the longitudinal acceleration when the main and auxiliary driving wheels are all in a slipping state; and a distribution determining section for determining a larger one of the rotational difference-dependent driving torque and the acceleration-dependent driving torque to be the driving torque to be transmitted to the auxiliary driving wheels.

5. A four-wheel drive control system according to claim 4, further comprising a vehicle climbing detector for detecting climbing of the vehicle, wherein the driving torque distribution controller further comprises a sloping road driving torque determining section for determining a sloping road-dependent driving torque at the time of climbing, and wherein the distribution determining section determines a largest one of the rotational difference-dependent driving torque, the acceleration-dependent driving torque and the sloping road-dependent driving torque to be the driving torque to be transmitted to the auxiliary driving wheels.

6. A four-wheel drive control method for a vehicle having a driving force distribution mechanism for transmitting a driving force from a power source to main driving wheels of a vehicle and capable of distributing the driving force to auxiliary driving wheels of the vehicle, the method comprising:

detecting a rotational speed difference between the main and auxiliary driving wheels; and controlling a distribution of the driving force to the main and auxiliary driving wheels on the basis of the rotational speed difference, the controlling comprising:

determining a rotational difference-dependent driving torque on the basis of the rotational speed difference;

determining an output-dependent driving torque on the basis of the output of the power source and the longitudinal load distribution, and determining a larger one of the rotational difference-dependent driving torque and the output-dependent driving torque to be the driving torque to be transmitted to the auxiliary driving wheels, wherein the controlling comprises determining a driving force to be transmitted to the auxiliary driving wheels on the basis of an output of the power source, a longitudinal load distribution in the vehicle and the rotational speed difference.

7. A four-wheel drive control method according to claim 6, wherein the determining of the output-dependent driving torque comprises altering a longitudinal load distribution component for determining the output-dependent driving torque, on the basis of a longitudinal acceleration of the vehicle.

8. A four-wheel drive control method for a vehicle having a driving force distribution mechanism for transmitting a driving force from a power source to main driving wheels of a vehicle and capable of distributing the driving force to auxiliary driving wheels of the vehicle, the method comprising:

detecting a rotational speed difference between the main and auxiliary driving wheels;

controlling a distribution of the driving force to the main and auxiliary driving wheels on the basis of the rotational speed difference;

detecting a longitudinal acceleration of the vehicle; and detecting substantially simultaneously whether the main and auxiliary driving wheels are all in a slipping state;

wherein the controlling comprises determining a driving torque to be transmitted to the auxiliary driving wheels in accordance with the longitudinal acceleration and the rotational speed difference when the main and auxiliary driving wheels are all in a slipping state.

9. A four-wheel drive control method for a vehicle having a driving force distribution mechanism for transmitting a driving force from a power source to main driving wheels of a vehicle and capable of distributing the driving force to auxiliary driving wheels of the vehicle, the method comprising:

detecting a rotational speed difference between the main and auxiliary driving wheels;

controlling a distribution of the driving force to the main and auxiliary driving wheels on the basis of the rotational speed difference;

detecting a longitudinal acceleration of the vehicle; and detecting whether the main and auxiliary driving wheels are all in a slipping state;

wherein the controlling comprises;

determining a driving torque to be transmitted to the auxiliary driving wheels in accordance with the longitudinal acceleration and the rotational speed difference when the main and auxiliary driving wheels are all in a slipping state;

determining a rotational difference-dependent driving torque on the basis of the rotational speed difference;

determining an acceleration driving torque on the basis of the longitudinal acceleration when the main and auxiliary driving wheels are all in a slipping state; and determining a larger one of the rotational difference-dependent driving torque and the acceleration-dependent driving torque to be the driving torque to be transmitted to the auxiliary driving wheels.

10. A four-wheel drive control method for a vehicle having a driving force distribution mechanism for transmitting a driving force from a power source to main driving wheels of a vehicle and capable of distributing the driving force to auxiliary driving wheels of the vehicle, the method comprising:

detecting a rotational speed difference between the main and auxiliary driving wheels;

controlling a distribution of the driving force to the main and auxiliary driving wheels on the basis of the rotational speed difference;

detecting a longitudinal acceleration of the vehicle;

detecting whether the main and auxiliary driving wheels are all in a slipping state; and detecting climbing of the vehicle, wherein the controlling comprises;

determining a driving torque to be transmitted to the auxiliary driving wheels in accordance with the longitudinal acceleration and the rotational speed difference when the main and auxiliary driving wheels are all in a slipping state;

determining a rotational difference-dependent driving torque on the basis of the rotational speed difference;

determining an acceleration-dependent driving torque on the basis of the longitudinal acceleration when the main and auxiliary driving wheels are all in a slipping state;

determining a sloping road-dependent driving torque at the time of climbing; and determining a largest one of the rotational difference-dependent driving torque, the acceleration-dependent driving torque and the sloping road-dependent driving torque to be a driving torque to be transmitted to the auxiliary driving wheels.

* * * * *